US012809624B2

(12) United States Patent
Shen et al.

(10) Patent No.: US 12,809,624 B2
(45) Date of Patent: Nov. 24, 2026

(54) MIXED PRECISION PROCESSING-IN-MEMORY

(71) Applicant: QUALCOMM Incorporated, San Diego, CA (US)

(72) Inventors: Jian Shen, San Diego, CA (US); Vardhana Mruthyunjaya, Mangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 19/014,046

(22) Filed: Jan. 8, 2025

(65) Prior Publication Data

US 2026/0195128 A1 Jul. 9, 2026

(51) Int. Cl.
*G06F 9/30* (2018.01)

(52) U.S. Cl.
CPC ................................ *G06F 9/30029* (2013.01)

(58) Field of Classification Search
CPC .................................................. G06F 9/30029
See application file for complete search history.

(56) References Cited

U.S. PATENT DOCUMENTS 12,032,925 B1* 7/2024 Kim ........................ G06F 7/523
2003/0061383 A1* 3/2003 Zilka ..................... G06F 1/3203 709/245
2009/0265528 A1* 10/2009 Du ...................... G06F 9/30014 712/E9.016
2018/0307971 A1* 10/2018 Sinha ..................... G06N 3/063
2023/0385624 A1 11/2023 Vrudhula et al.
2023/0393849 A1* 12/2023 Kotra .................... G06F 9/3877
2024/0329930 A1* 10/2024 Pudukotai Dinakarrao ................ G06F 7/50
2024/0419445 A1 12/2024 Ro et al.

FOREIGN PATENT DOCUMENTS

EP 4012618 A1 6/2022

OTHER PUBLICATIONS

International Search Report and Written Opinion—PCT/US2025/056457—ISA/EPO—Mar. 17, 2026.

* cited by examiner

*Primary Examiner* — Farley Abad
(74) *Attorney, Agent, or Firm* — Seyfarth Shaw LLP

(57) ABSTRACT

A method for mixed precision processing-in-memory includes receiving, by a compute controller of a memory module, an instruction to perform an operation associated with a machine learning workload. The memory module includes multiple execution engines and the instruction indicates a first precision. An execution engine of the multiple execution engines is selected for executing the operation based on the instruction.

17 Claims, 7 Drawing Sheets

400

| Instructions | <Precision> | Operations |
| --- | --- | --- |
| Precision_on | .FP16, .FP8, INT8, .INT4 | Which execution unit or execution unit partitions to power on |
| Mult<precision> DST, SRC1, SRC2 | .FP16, .FP8, .INT8, .INT4 | DST= SRC1 x SRC2 |
| Add<precision> DST, SRC1, SRC2 | .FP16, .FP8, .INT8, .INT4 | DST= SRC1 + SRC2 |
| MAC<precision> DST, SRC1, SRC2 | .FP16, .FP8, .INT8, .INT4 | DST+= SRC1 x SRC2 |
| AF<precision> DST, SRC1 | .FP16, .FP8, .INT8, .INT4 | ReLUActivation function |

*FIG. 4*

MIXED PRECISION PROCESSING-IN-MEMORY

BACKGROUND

Field

Aspects of the present disclosure relate to computing devices, and more specifically mixed precision processing-in-memory.

BACKGROUND

Mobile or portable computing devices include mobile phones, laptop, palmtop and tablet computers, portable digital assistants (PDAs), portable game consoles, and other portable electronic devices. Mobile computing devices are comprised of many electrical components that consume power and generate heat. The components (or compute devices) may include system-on-a-chip (SoC) devices, central processing unit (CPU) devices, graphics processing unit (GPU) devices, neural processing unit (NPU) devices, digital signal processors (DSPs), and modems, among others.

Artificial neural networks may comprise interconnected groups of artificial neurons (e.g., neuron models). The artificial neural network (ANN) may be a computational device or be represented as a method to be performed by a computational device. Convolutional neural networks (CNNs) are a type of feed-forward ANN. Convolutional neural networks may include collections of neurons that each have a receptive field and that collectively tile an input space. Convolutional neural networks, such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Given the many useful applications of neural networks, there is growing demand for use of neural networks on mobile devices that may have limited resources to solve increasingly complex problems in further areas of application. One area of exploration is generative artificial intelligence.

Large language models (LLMs) have made significant advances in the natural language understanding domain, and have gained popularity with respect to textual generative tasks as well as tasks that involve modelling information from textual and visual domains. LLMs may receive a prompt from a user, and in turn, may generate a response or completion.

Because of the significant advances in LLMs and the broad range of applications, there is growing demand for use of such machine learning models on mobile devices, which may have limited resources. However, such models may encounter latency due in part to memory bottlenecks.

One approach for addressing the memory bottlenecks is processing-in-memory (PIM). PIM incorporates a processor into or near memory rather than transferring large amounts of data to and from a computing unit. However, conventional PIM approaches have limited instruction sets and data formats and may result in increased power consumption.

SUMMARY

Some aspects of the present disclosure are directed to a memory module. The memory module has one or more memory elements. The memory module also includes a plurality of execution engines. Each of the plurality of execution engines is configured to conduct computations with a different precision level. The memory module additionally includes a compute controller. The compute controller is configured to receive an instruction to perform an operation associated with a machine learning workload. The instruction indicates a first precision. The compute controller is further configured to select an execution engine of the plurality of execution engines for executing the operation based on the instruction.

In some aspects of the present disclosure, a method for mixed precision processing-in-memory. The method includes receiving, by a compute controller of a memory module, an instruction to perform an operation associated with a machine learning workload. The memory module includes a number of execution engines and the instruction indicates a first precision. The method also includes selecting, by the compute controller, an execution engine of the number of execution engines for executing the operation based on the instruction.

Some aspects of the present disclosure are directed to an apparatus. The apparatus includes means for receiving an instruction to perform an operation associated with a machine learning workload. The memory module includes a number of execution engines and the instruction indicates a first precision. The apparatus further includes means for selecting an execution engine of the number of execution engines for executing the operation based on the instruction.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 4 is a table of an example instruction set for PIM architectures, in accordance with various aspects of the present disclosure.

DETAILED DESCRIPTION

Figure 1:
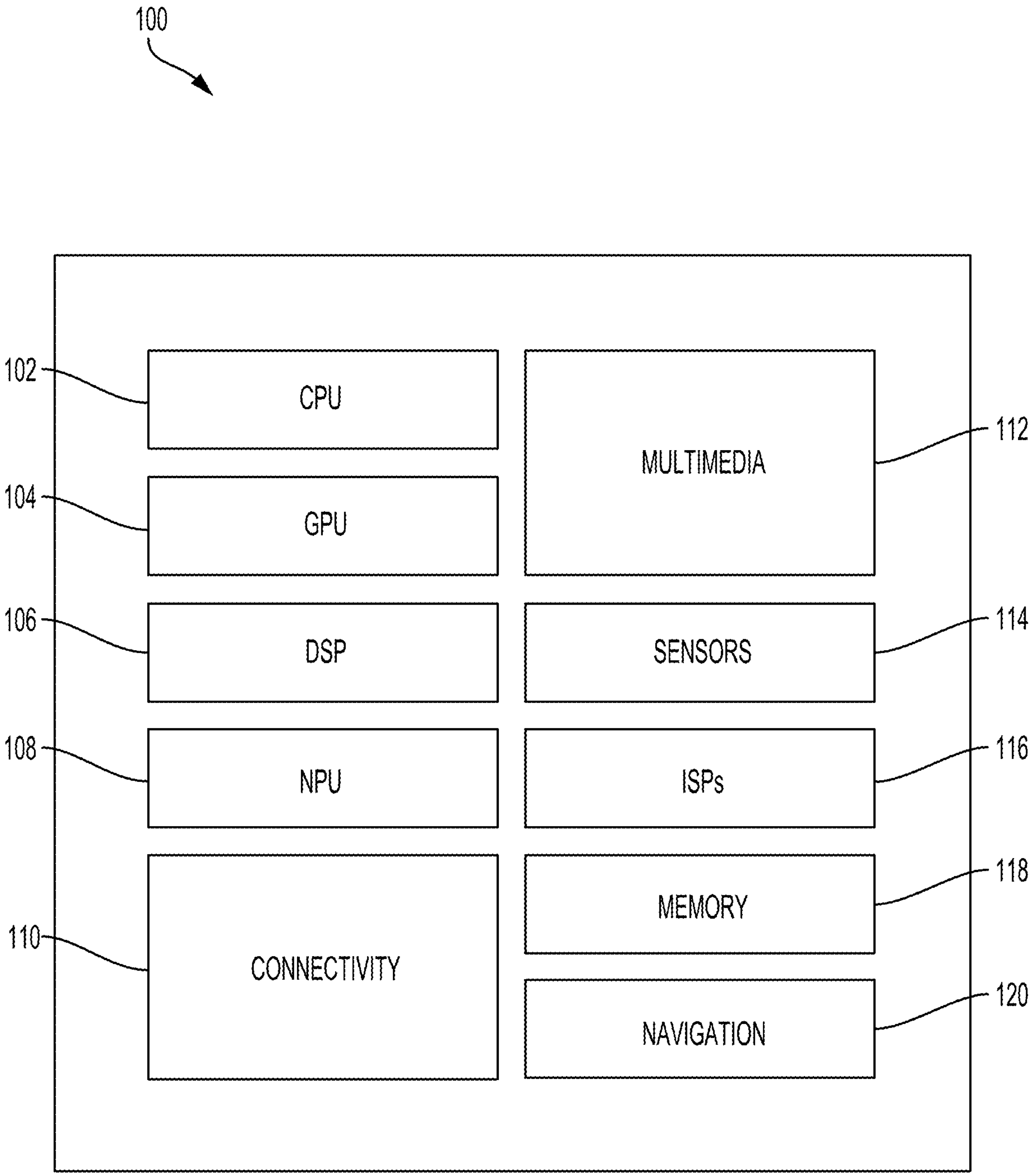
FIG. 1 illustrates an example implementation of a host system-on-a-chip (SoC), including a mixed precision processing-in-memory (PIM) architecture, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term "and/or" is intended to represent an "inclusive OR," and the use of the term "or" is intended to represent an "exclusive OR." As described, the term "exemplary" used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

Processing-in-memory (PIM) refers to incorporating a processor into or near memory rather than transferring large amounts of data to and from a computing unit. PIM may mitigate memory bottlenecks because PIM may enable data to be processed directly in the memory. However, conventional PIM architectures may only have a limited instruction set and available data formats. Furthermore, conventional PIM architectures may have increased power consumption.

Some applications of PIM may involve repetitive parallel operations including, but not limited to, matrix operations with the same operand type or token generation in large language models, for example.

Aspects of the present disclosure are directed to a mixed precision PIM architecture. The PIM architecture may have an instruction set with a precision indication. The PIM architecture may include multiple separate execution units for different precisions. The execution units may be powered down individually. In some aspects, the PIM architecture may include shared execution units for different precisions. The shared execution units may power down partitions with a fine-grain bit masking technique.

Particular aspects of the subject matter described in this disclosure can be implemented to realize one or more of the following potential advantages. In some examples, the described techniques, (e.g., selecting an execution engine of the execution engines for executing the operation based on the instruction) may reduce processing latency and power consumption in machine learning models. Accordingly, aspects of the present disclosure may have application to repetitive back-to-back parallel operations such as matrix operations with the same operand type, as well as token generation in large language models, for instance.

FIG. 1 illustrates an example implementation of a host system-on-a-chip (SoC) 100, which includes a mixed precision PIM architecture, in accordance with aspects of the present disclosure. The host SoC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, universal serial bus (USB) connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU) 108. The host SoC 100 may also include a sensor processor 114, image signal processors (ISPs) 116, a navigation module 120, which may include a global positioning system (GPS), and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

As described, aspects of the present disclosure are directed to a mixed precision PIM architecture. The PIM architecture may have an instruction set with a precision indication. The PIM architecture may include multiple separate execution units for different precisions. The execution units may be powered down individually. In some aspects, the PIM architecture may include shared execution units for different precisions. The shared execution units may power down partitions with a fine-grain bit masking technique.

Figure 2:
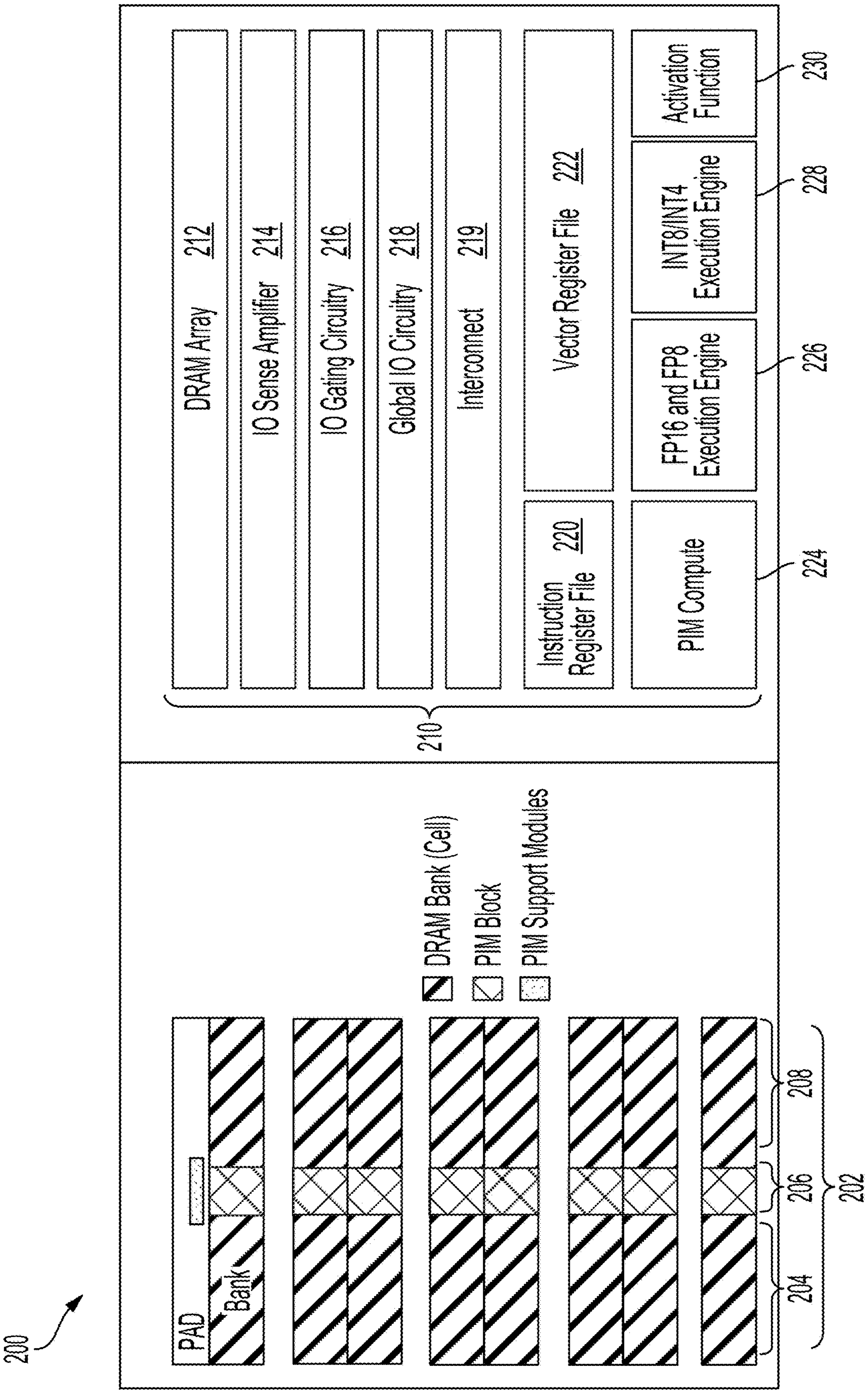
FIG. 2 is a block diagram illustrating an example architecture for a mixed precision PIM, in accordance with various aspects of the present disclosure.
Figure 3:
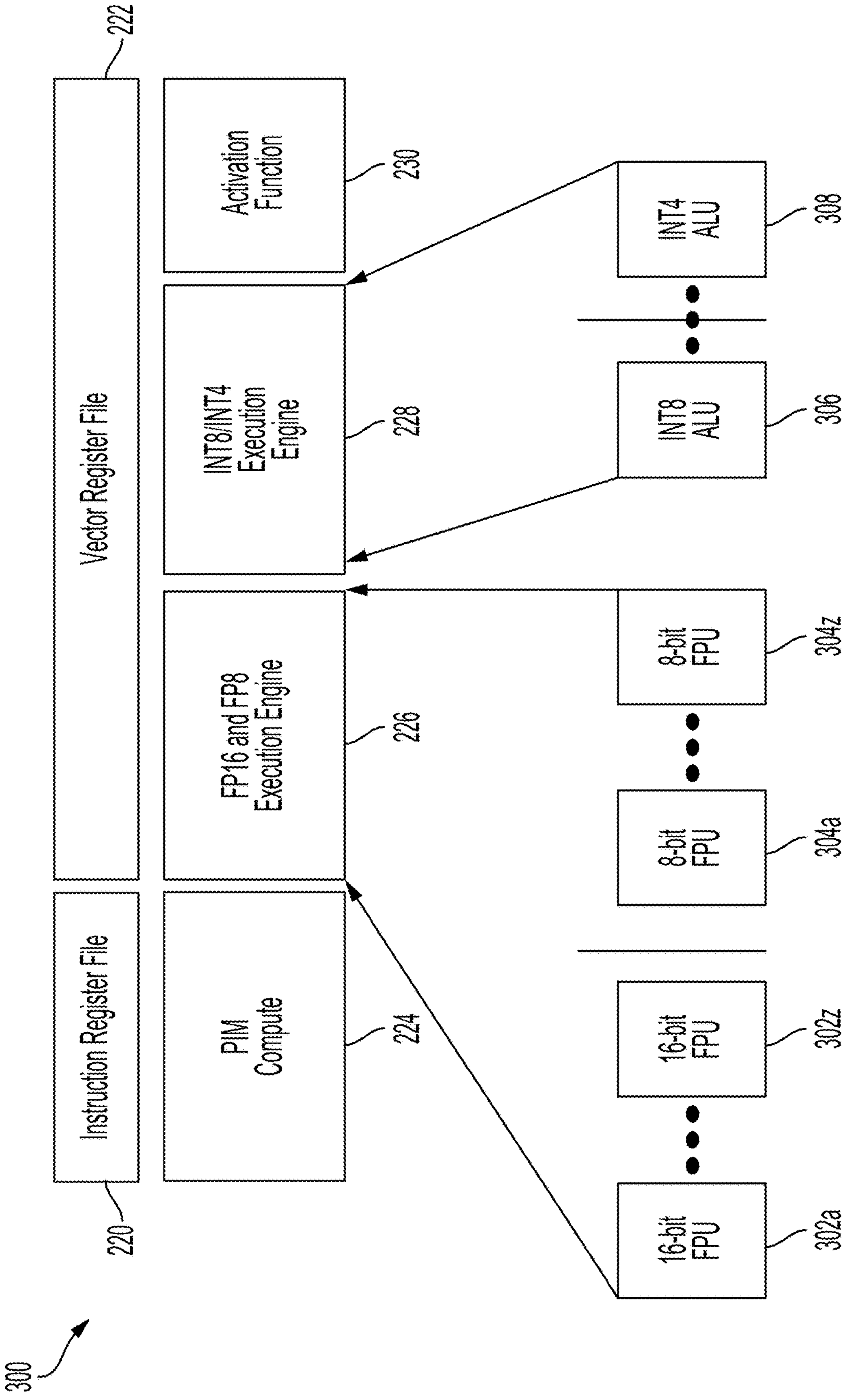
FIG. 3 is a block diagram illustrating an expanded view of the execution engines of FIG. 2, in accordance with various aspects of the present disclosure.

According to aspects of the present disclosure, a memory module includes a plurality of execution engines. The memory module may include means for means for receiving an instruction to perform an operation associated with a machine learning workload and a means for selecting an execution engine of the plurality of execution engines for executing the operation based on the instruction. In one configuration, receiving means and/or the selecting means may comprise input/output (IO) sense amplifier (IOSA) 214, IO gating circuitry 216, PIM compute block 224 and/or execution engines 226 as shown in FIG. 2 and FIG. 3. In other aspects, the aforementioned means may be any structure or any material configured to perform the functions recited by the aforementioned means.

FIG. 2 is a block diagram illustrating an example architecture 200 for a mixed precision processing-in-memory (PIM), in accordance with various aspects of the present disclosure. Referring to FIG. 2, the example architecture 200 includes a processing table 202. The processing table 202 may specify a bank of memory (e.g., dynamic random access memory (DRAM) 204) that may be employed for processing. The processing table 202 may also include a PIM block 206 and PIM support modules 208. The PIM block 206 may indicate a PIM execution engine for performing a processing operation. The PIM support modules 208 may include support logic for performing the computation. By way of example, rather than limitation, the support logic may be configured to perform functions such as logical exclusive OR (XOR), AND, or NOT, for instance.

The example architecture 200 may also include a processing stack 210. The processing stack 210 may include a DRAM array 212. The processing stack 210 may also include an input/output (IO) sense amplifier (IOSA) 214 and IO gating circuitry 216. An IOSA 214 may refer to circuitry that amplifies weaker electrical signals stored on memory cell bit lines to enable accurate reading of data from memory (e.g., DRAM array 212). On the other hand, the IO gating circuitry 216 may control connection of an IO device to a computer bus, for example. Global IO circuitry 218 may be employed for data transfers between main memory and the DRAM array 212 configured for processing. An interconnect 219 may enable communication between the DRAM array 212 and one or more processors (e.g., CPU 102, GPU 104, NPU 108).

The processing stack 210 may include an instruction register file (IRF) 220 and a vector register file (VRF) 222. The IRF 220 may comprise a register file in memory of frequently used instructions. The VRF 222 may comprise a register configured to store a vector of operands for an operation of the instruction.

The processing stack 210 may further include a PIM compute block 224. The PIM compute block 224 may receive an instruction. The instruction may relate to performing an operation associated with a machine learning workload. For instance, the machine learning workload may comprise (but is not limited to) matrix operations (e.g., multiply accumulate (MAC) operations) with the same operand type or token generation in large language models, for example.

The PIM compute block 224 may determine a compute engine for executing a PIM operation based on the instruction received. For example, a PIM may select a 16-bit floating point (FP16) and 8-bit floating point (FP8) execution engine 226, an 8-bit integer/4-bit integer (INT8/INT4) execution engine 228, and/or an activation function 230 for executing the PIM operation based on the instruction.

FIG. 3 is a block diagram illustrating an expanded view of the execution engines 226 and 228 of FIG. 2, in accordance with various aspects of the present disclosure. Referring to FIG. 3, the execution engine 226 may include a set of 16-bit floating point units (FPUs) 302*a-z* and a set of 8-bit FPUs 304*a-z*. The execution engine 228 may include one or more INT8 arithmetic logic units (ALUs) 306 and one or more INT4 ALUs 308. The PIM compute block 224 may select an instruction register file 222 corresponding to the execution engine to be used in computing a specified PIM operation. In accordance with a selected register file of the PIM compute block 224, a set of corresponding execution engines (e.g., 302*a-z*, 304*a-z*, 306, and/or 308) may be employed to perform the PIM operation. For example, when the PIM operation uses higher precision, the FP16/FP8 execution engine 226 may be selected to perform the PIM operation. In some aspects the execution engines having the same precision (e.g., FP16 or FP8) or mixed precision (e.g., FP16 and FP8 or INT8 and INT4) are selected.

FIG. 4 is a table of an example instruction set 400 for PIM architectures, in accordance with various aspects of the present disclosure. The example instruction set 400 may define a set of instructions that are agnostic and may be applied to any double data rate (DDR) technology.

The instructions of the example instruction set 400 may execute a machine learning workload. For example, the machine learning workload may comprise a matrix operation such as a convolution operation, application of an activation function, or token generation, for instance. Each of the instructions may be specified with an explicit precision indication (e.g., FP8). In the example instruction set 400, the precision may be selected from FP16, FP8, INT8, or INT4. However, the precision levels listed are merely examples and not limiting.

A controller such as, but not limited to, the PIM compute block 224, for example, may configure an execution engine (e.g., 226 or 228) based on the specified precision. The precision may be configured with an explicit precision for a current instruction or by employing a look ahead to determine the precision of the instructions to be executed. For instance, when the PIM compute block 224 receives an instruction precision_ of FP 16, the PIM compute block 224 may power on the one or more 16-bit FPUs (e.g., 302*a-z*).

In a second example, the PIM compute block 224 may receive an instruction to perform an operation and may select an execution engine based on the operation. For instance, the PIM compute block 224 may receive an instruction, MAC FP8 DST, SRC1, SRC2, where MAC represents a multiply accumulate operation, DST represents a destination address and SRC1, SRC2 may represent the source addresses of memory elements (e.g., 212) for the operands to be multiplied. In turn, the PIM compute block 224 may selectively power on one or more 8-bit FPUs (e.g., 304*a-z*). The other execution engines (e.g., 228) may be maintained in a power OFF state. In some aspects, a portion of an execution engine (e.g., 226) that is not selected for the operation (e.g., 16-bit FPUs 302*a-z*) may also be maintained in the power OFF state.

Continuing with the second example, having selectively powered on an 8-bit FPU, the values at SRC1 and SRC2 may be loaded to the 8-bit FPU (e.g., 304*a*). The 8-bit FPU (e.g., 304*a*) may execute the multiplication operation by multiplying the value at SRC1 by the value at SRC2. Then, the product of the multiplication may be added to a value stored at the DST address. In turn, the sum of the value stored at DST and the product of the multiplication operation may be stored at the DST address.

In some aspects, multiple 8-bit FPUs (304*a-z*) may be powered and employed to parallelize the computation of the MAC operation. Multiple execution engines (e.g., 226, 228) may be powered on and employed to conduct processing-in-memory operations. For instance, the PIM compute block 224 may receive a MAC operation with a FP8 precision. The PIM compute block 224 may also receive an instruction to apply an activation function (e.g., rectified linear unit (ReLU)) at a different precision (e.g., INT8). As such, the PIM compute block 224 may power on an 8-bit FPU (e.g., 304*z*) as well as an INT8 ALU for executing respective portions of the operations.

Accordingly, by enabling the precision indication in the instruction set architecture, precision conversion determinations by hardware may be reduced, and in some aspects, may be avoided. Thus, aspects of the present disclosure may beneficially facilitate fine grained power supply to execution engines (e.g., 226 or 228) or execution engine partitions (e.g., 302*a*, 304*a* or 306) when not used. Accordingly, aspects of the present disclosure may be applied to process repetitive patterns of machine learning workloads (e.g., token generation or convolution operation) to enable fine grained optimization.

Figure 5:
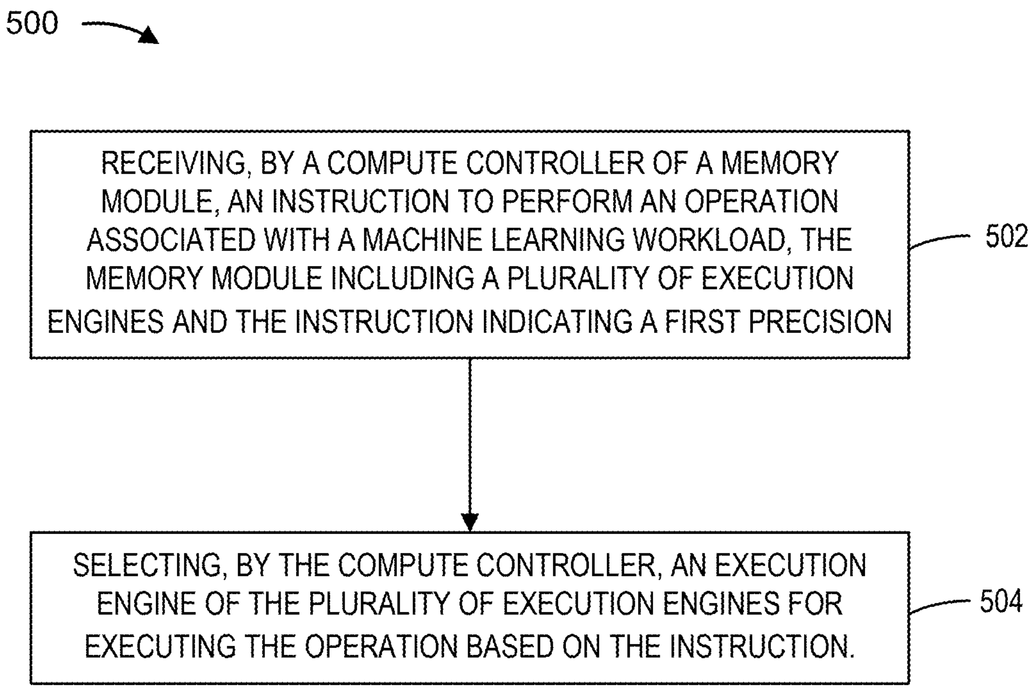
FIG. 5 is a flow diagram illustrating an example process performed, for example, by a computational device configured with a mixed precision PIM architecture, in accordance with various aspects of the present disclosure.

FIG. 5 is a flow diagram illustrating an example process 500 performed, for example, a computational device configured with mixed precision processing-in-memory (PIM) architecture, in accordance with various aspects of the present disclosure. The example process 500 is an example of PIM.

As shown in FIG. 5, at block 502, the process 500 receives, by a compute controller of a memory module, an instruction to perform an operation associated with a machine learning workload. The memory module includes a plurality of execution engines and the instruction indicates a first precision. For example, as described with reference to FIG. 3, the PIM compute block 224 may receive an instruction. The instruction may relate to performing an operation associated with a machine learning workload. For instance, the machine learning workload may comprise (but is not limited to) matrix operations (e.g., multiply accumulate (MAC) operations) with the same operand type or token generation in large language models, for example.

At block 504, the process selects, by the compute controller, an execution engine of the plurality of execution engines for executing the operation based on the instruction. As described, for example, with reference to FIG. 3, the PIM compute block 224 may determine a compute engine for executing a PIM operation based on the instruction received. For example, a PIM may select a 16-bit floating point (FP16) and 8-bit floating point (FP8) execution engine 226, an 8-bit integer/4-bit integer (INT8/INT4) execution engine 228, and/or an activation function 230 for executing the PIM operation based on the instruction.

Figure 6:
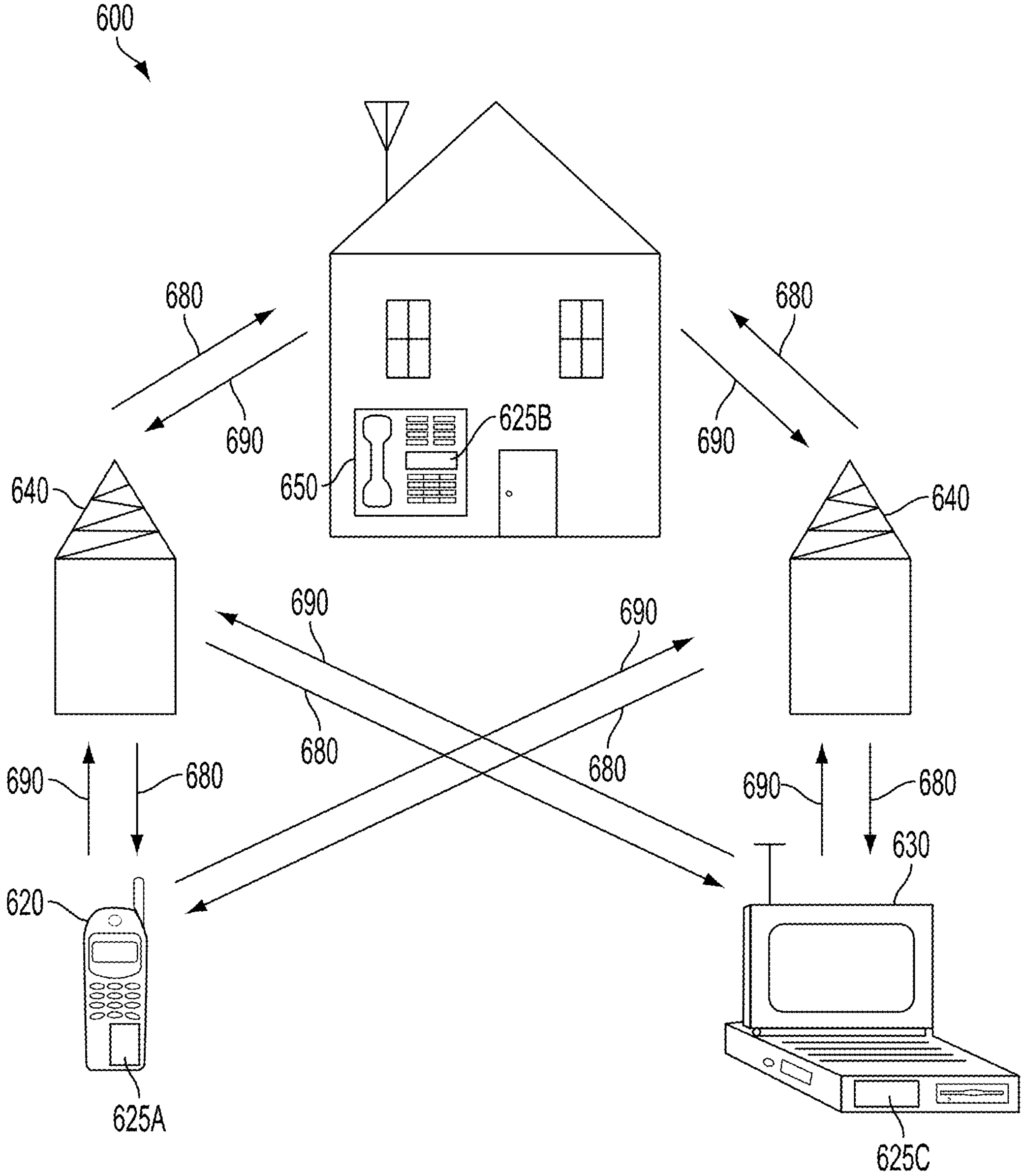
FIG. 6 is a block diagram showing an exemplary wireless communications system in which a configuration of the present disclosure may be advantageously employed.

FIG. 6 is a block diagram showing an exemplary wireless communications system 600, in which an aspect of the present disclosure may be advantageously employed. For purposes of illustration, FIG. 6 shows three remote units 620, 630, and 650, and two base stations 640. It will be recognized that wireless communications systems may have many more remote units and base stations. Remote units 620, 630, and 650 include integrated circuit (IC) devices 625A, 625B, and 625C that include the disclosed PIM compute block 224 with execution engines 226, 228. It will be recognized that other devices may also include the disclosed PIM compute block 224 with execution engines 226, 228, such as the base stations, switching devices, and network equipment. FIG. 6 shows forward link signals 680 from the base stations 640 to the remote units 620, 630, and 650, and reverse link signals 690 from the remote units 620, 630, and 650 to the base stations 640.

In FIG. 6, remote unit 620 is shown as a mobile telephone, remote unit 630 is shown as a portable computer, and remote unit 650 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 6 illustrates remote units according to the aspects of the present disclosure, the disclosure is not limited to these exemplary illustrated units. Aspects of the present disclosure may be suitably employed in many devices, which include the disclosed PIM compute block 224 with execution engines 226, 228.

Figure 7:
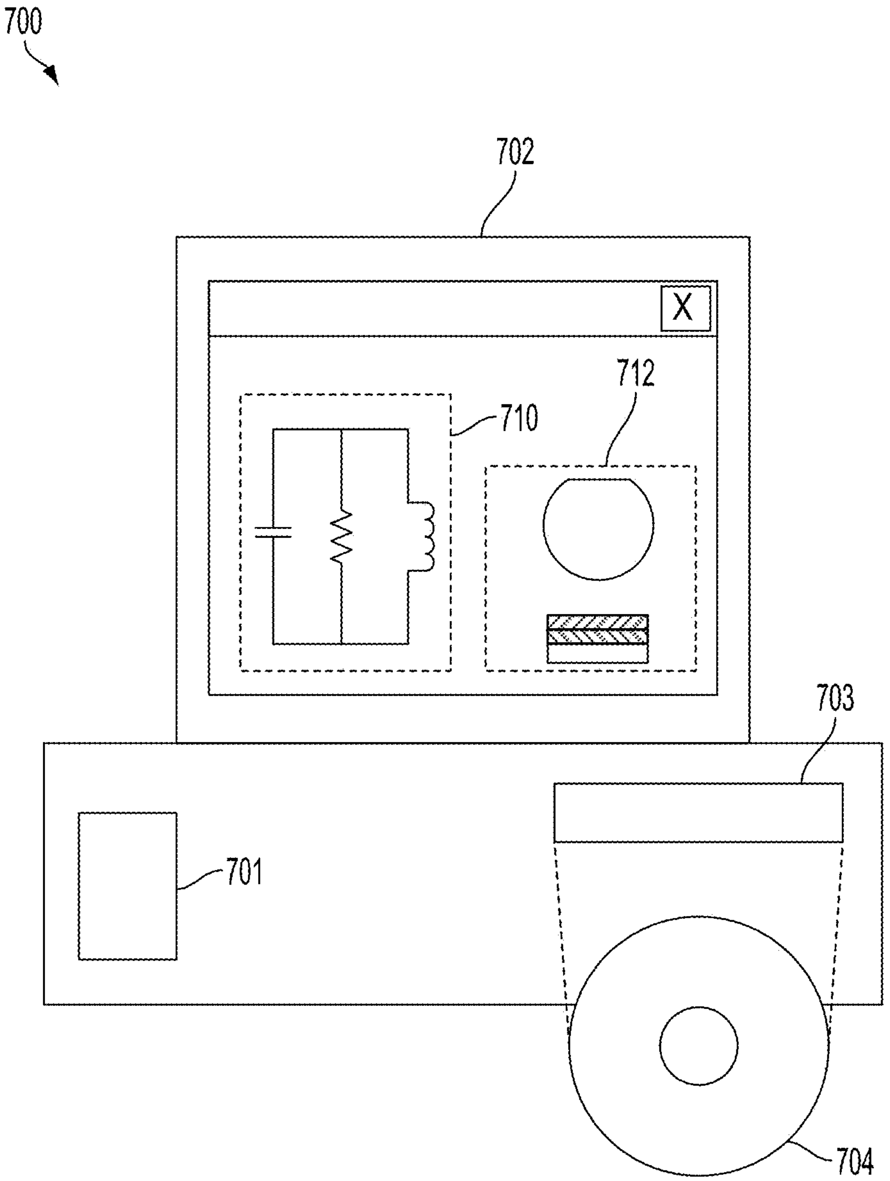
FIG. 7 is a block diagram illustrating a design workstation used for circuit, layout, and logic design of components, in accordance with various aspects of the present disclosure.

FIG. 7 is a block diagram illustrating a design workstation 700 used for circuit, layout, and logic design of a semiconductor component, such as the PIM compute block 224 with execution engines 226, 228 disclosed above. The design workstation 700 includes a hard disk 701 containing operating system software, support files, and design software such as Cadence or OrCAD. The design workstation 700 also includes a display 702 to facilitate design of a circuit 710 or a semiconductor component 712, such as the PIM compute block 224 with execution engines 226, 228. A storage medium 704 is provided for tangibly storing the design of the circuit 710 or the semiconductor component 712 (e.g., the PLD). The design of the circuit 710 or the semiconductor component 712 may be stored on the storage medium 704 in a file format such as GDSII or GERBER. The storage medium 704 may be a CD-ROM, DVD, hard disk, flash memory, or other appropriate device. Furthermore, the design workstation 700 includes a drive apparatus 703 for accepting input from or writing output to the storage medium 704.

Data recorded on the storage medium 704 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 704 facilitates the design of the circuit 710 or the semiconductor component 712 by decreasing the number of processes for designing semiconductor wafers.

EXAMPLE ASPECTS

Aspect 1: A memory module, comprising: one or more memory elements; a plurality of execution engines, each of the plurality of execution engines being configured to conduct computations with a different precision level; and a compute controller configured to: receive an instruction to perform an operation associated with a machine learning workload, the instruction indicating a first precision; and select an execution engine of the plurality of execution engines for executing the operation based on the instruction.

Aspect 2: The memory module of Aspect 1, in which the instruction includes an explicit precision indication.

Aspect 3: The memory module of Aspect 1 or 2, in which the compute controller is further configured to transition the execution engine selected for execution of the operation to a power ON state.

Aspect 4: The memory module of any preceding Aspect, in which unselected execution engines of the plurality of execution engines are maintained in a power OFF state.

Aspect 5: The memory module of any preceding Aspect, in which the compute controller is further configured to retrieve one or more operands from one or more memory elements based on the instruction, the execution engine selected for executing the operation using the one or more operands.

Aspect 6: The memory module of any preceding Aspect, in which the compute controller is further configured to receive at least a second instruction to perform a second operation associated with the machine learning workload, the second instruction indicating a second precision.

Aspect 7: The memory module of any preceding Aspect, in which the machine learning workload comprises applying an activation function or token generation.

Aspect 8: A method, comprising: receiving, by a compute controller of a memory module, an instruction to perform an operation associated with a machine learning workload, the memory module including a plurality of execution engines and the instruction indicating a first precision; and selecting, by the compute controller, an execution engine of the plurality of execution engines for executing the operation based on the instruction.

Aspect 9: The method of Aspect 8, in which the instruction includes an explicit precision indication.

Aspect 10: The method of Aspect 8 or 9, further comprising transitioning the execution engine selected for execution of the operation to a power ON state.

Aspect 11: The method of any of Aspects 8-10, in which unselected execution engines of the plurality of execution engines are maintained in a power OFF state.

Aspect 12: The method of any of Aspects 8-11, further comprising: retrieving one or more operands from one or more memory elements based on the instruction; and executing, by the execution engine selected for execution, the operation using the one or more operands.

Aspect 13: The method of any of Aspects 8-12, further comprising receiving, by the compute controller, at least a second instruction to perform a second operation associated with the machine learning workload, the second instruction indicating a second precision.

Aspect 14: The method of any of Aspects 8-13, in which the machine learning workload comprises applying an activation function or token generation.

Aspect 15: An apparatus, comprising: means for receiving an instruction to perform an operation associated with a machine learning workload in a memory module including a plurality of execution engines, the instruction indicating a first precision; and means for selecting an execution engine of the plurality of execution engines for executing the operation based on the instruction.

Aspect 16: the apparatus of Aspect 15, in which the instruction includes an explicit precision indication.

Aspect 17: The apparatus of Aspect 15 or 16, further comprising means for transitioning the execution engine selected for execution of the operation to a power ON state.

Aspect 18: The apparatus of any of Aspects 15-17, in which unselected execution engines of the plurality of execution engines are maintained in a power OFF state.

Aspect 19: The apparatus of any of Aspects 15-18, further comprising: means for retrieving one or more operands from one or more memory elements based on the instruction; and means for executing, by the execution engine selected for execution, the operation using the one or more operands.

Aspect 20: The apparatus of any of Aspects 15-19, further comprising means for receiving at least a second instruction to perform a second operation associated with the machine learning workload, the second instruction indicating a second precision.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present disclosure is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the present disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM, flash memory, ROM, erasable programmable read-only memory (EPROM), EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to the disclosure will be readily apparent to those skilled in the art, and the generic principles defined may be applied to other variations without departing from the spirit or scope of the disclosure. Thus, the present disclosure is not intended to be limited to the examples and designs described, but is to be accorded the widest scope consistent with the principles and novel features disclosed.

What is claimed is:

1. A memory module, comprising:

one or more memory elements;

a plurality of execution engines integrated within the memory module, each of the plurality of execution engines being configured to conduct computations with a different precision level; and a compute controller configured to:

receive an instruction to perform an operation associated with a machine learning workload, the instruction indicating a first precision as an explicit precision indication embedded in the instruction; and select an execution engine of the plurality of execution engines for executing the operation based on the explicit precision indication.

2. The memory module of claim 1, in which the compute controller is further configured to transition the execution engine selected for execution of the operation to a power ON state.

3. The memory module of claim 2, in which unselected execution engines of the plurality of execution engines are maintained in a power OFF state.

4. The memory module of claim 1, in which the compute controller is further configured to retrieve one or more operands from the one or more memory elements based on the instruction, the execution engine selected for executing the operation using the one or more operands.

5. The memory module of claim 1, in which the compute controller is further configured to receive at least a second instruction to perform a second operation associated with the machine learning workload, the second instruction indicating a second precision.

6. The memory module of claim 1, in which the machine learning workload comprises applying an activation function or token generation.

7. A method, comprising:

receiving, by a compute controller of a memory module, an instruction to perform an operation associated with a machine learning workload, the memory module including a plurality of execution engines integrated within the memory module and the instruction indicating a first precision as an explicit precision indication embedded in the instruction; and selecting, by the compute controller, an execution engine of the plurality of execution engines for executing the operation based on the explicit precision indication.

8. The method of claim 7, further comprising transitioning the execution engine selected for execution of the operation to a power ON state.

9. The method of claim 8, in which unselected execution engines of the plurality of execution engines are maintained in a power OFF state.

10. The method of claim 7, further comprising:

retrieving one or more operands from one or more memory elements based on the instruction; and executing, by the execution engine selected for execution, the operation using the one or more operands.

11. The method of claim 7, further comprising receiving, by the compute controller, at least a second instruction to perform a second operation associated with the machine learning workload, the second instruction indicating a second precision.

12. The method of claim 7, in which the machine learning workload comprises applying an activation function or token generation.

13. An apparatus, comprising:

means for receiving an instruction to perform an operation associated with a machine learning workload in a memory module including a plurality of execution engines integrated within the memory module, the instruction indicating a first precision as an explicit precision indication embedded in the instruction; and means for selecting an execution engine of the plurality of execution engines for executing the operation based on the explicit precision indication.

14. The apparatus of claim 13, further comprising means for transitioning the execution engine selected for execution of the operation to a power ON state.

15. The apparatus of claim 14, in which unselected execution engines of the plurality of execution engines are maintained in a power OFF state.

16. The apparatus of claim 13, further comprising:

means for retrieving one or more operands from one or more memory elements based on the instruction; and means for executing, by the execution engine selected for execution, the operation using the one or more operands.

17. The apparatus of claim 13, further comprising means for receiving at least a second instruction to perform a second operation associated with the machine learning workload, the second instruction indicating a second precision.

* * * * *